United States Patent Office 3,498,747
Patented Mar. 3, 1970

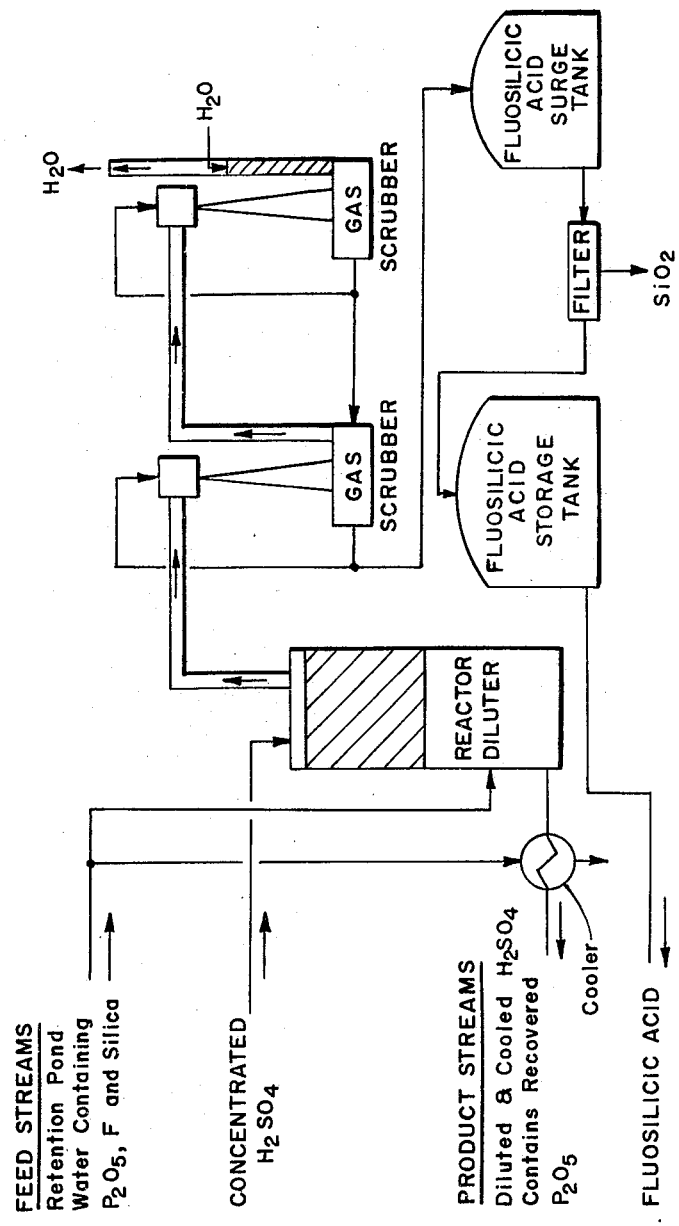

3,498,747
RECOVERY OF $P_2O_5$ VALUES AND FLUORINE PRODUCTS FROM POND WATER
Roy G. Smaltz, Valrico, and William A. Satterwhite, Lakeland, Fla., assignors, by mesne assignments, to United States Steel Corporation, a corporation of Delaware
Filed July 7, 1967, Ser. No. 651,807
Int. Cl. C01b 33/10, 25/26
U.S. Cl. 23—153                    4 Claims

ABSTRACT OF THE DISCLOSURE

Water, used to scrub gases and vapors evolved during the various steps in the manufacture of phosphate products, and containing $P_2O_5$, fluorine and silica is passed into a waste pond. A portion of the water from the waste pond is used to dilute concentrated sulfuric acid in a reactor, and as a result of the heat generated in dilution, fluoride and silica compounds are vaporized and removed. The $P_2O_5$ values are recovered in the diluted sulfuric acid which is withdrawn from the reactor and subsequently used in the phosphate rock digestion step or elsewhere. The evolved gases which are now rich in fluoride and silica compounds are scrubbed with water, filtered to remove silica, and concentrated fluosilicic acid recovered as a product.

SUMMARY OF INVENTION

In the manufacture of wet process phosphoric acids and other phosphatic materials, gases and vapors are evolved and these are scrubbed with water to remove fluorine, silica and small amounts of $P_2O_5$ therein, and such water, which is regarded as waste material, is passed into a pond. The pond water not only is considered waste material but also presents a hazard in that during exposure to the sun and atmospheric conditions, there is some evolution of fluorine, and further, in the case of heavy rains, some of the pond water may overflow into streams.

By rerouting this waste water back to use in the processes, the requirements of fresh water are reduced and better utilized. And the volume of waste water can be restricted to the capacity of the waste pond. Otherwise an excess volume often results which cannot be retained in the pond and must be chemically treated before discharge to public waters. This is expensive and presents a further hazard to animal and vegetable life as well as a loss of valuable products.

We have discovered that under the exposure conditions mentioned, there is a concentration of $P_2O_5$ values in the pond water, reaching as high as 0.5–2.5 percent $P_2O_5$ and higher, while the fluorine dissolved in the pond water increases to about 0.5–1.0 percent. We have further discovered that these values can be readily recovered by an inexpensive procedure which results in the recovery of the $P_2O_5$ content in sulfuric acid, and the recovery of the fluorine values as fluosilicic acid. In our process, a portion of pond water is reacted in a container with concentrated sulfuric acid whereby, under the heat of dilution, fluorine and silica compounds along with steam are evolved. These compounds are scrubbed with water, and the stream filtered to remove silica, the final product being fluosilicic acid. It was surprising to find that practically all of the fluorine was evolved, leaving almost none retained in the sulfuric acid body.

The sulfuric acid retains the $P_2O_5$ values and constitutes a valuable product. It is preferably used in the digestion of phosphate rock, but it may be used in other ways whereby the retained $P_2O_5$ is recovered as product.

DRAWING

The accompanying drawing is a diagrammatic showing of apparatus which may be employed in the practice of the invention.

DETAILED DESCRIPTION

By passing scrub water from the towers through which gases and vapors evolved in the manufacture of phosphate products flow into an open pond which is exposed to the sun and atmosphere, there is a continuous removal of water and a concentration of the $P_2O_5$ and fluorine values until substantial amounts of these values are present in the pond water. When the $P_2O_5$ values build some appreciable value, such as up to about 0.5 percent and above through such manufacturing processes, effective recovery can be brought about while also recovering the fluorine values by diluting concentrated sulfuric acid with a portion of the pond water. As shown in the drawing, pond water is passed into a reactor, while concentrated sulfuric acid is also brought into the reactor, the heat of dilution being sufficiently high to evolve substantially all of the fluorine.

Starting with a concentrated sulfuric acid, we add enough pond water to dilute the acid sufficiently to raise the temperature high enough to vaporize fluorine and silica. For example, pond water may be added to dilute the acid to about 40–80 percent sulfuric acid. We prefer a dilution to about 50–70 percent sulfuric acid. The $P_2O_5$ values of the pond water are recovered in the sulfuric acid and the sulfuric acid may then be reused in the digestion of phosphate rock or in any other desired manner. Any suitable type of reactor may be employed. If desired, a large carbon brick reactor may be employed, and this may be equipped with an agitator. The reactor is preferably operated at the highest temperature possible and the dilute acid, such as, for example, 60 percent acid, may be cooled through a cooler or heat exchanger. The gases leaving the reactor may be scrubbed in open wall spray towers or in jet venturi scrubbers preferably in series, or in any other suitable apparatus.

The evolved HF and $SiF_4$ are contacted with water in the jet venturi scrubbers, and after the removal by filtration of silica, a valuable product is recovered as fluosilicic acid.

Specific examples illustrative of our process may be set out as follows:

Example I

Scrub waters used in the tower for scrubbing gases and vapors from processes producing phosphates were passed into a large open pond exposed to the atmosphere. Under atmospheric exposure, the pond water was found to have a $P_2O_5$ content of about 2.5 percent. A portion of the pond water was mixed with 98.5 percent sulfuric acid to dilute the sulfuric acid to 55 percent. A maximum temperature of about 250° F. was reached. Agitation was continued during the reaction. After about 30 minutes, it was found that about 85 percent of the fluorine was evolved and collected as a separate product and that the $P_2O_5$ content of the pond water was retained with the sulfuric acid. The sulfuric acid and retained $P_2O_5$ values were also recovered as a product.

Example II

The process was carried out as described in Example I except that the pond water contained about 2 percent $P_2O_5$ and the sulfuric acid was diluted from 95 percent to 50 percent. The $P_2O_5$ content of the pond water was recovered in the sulfuric acid and the sulfuric acid and the recovered $P_2O_5$ were reused in the digestion of phosphate rock.

Example III

A series of tests were carried out at atmospheric conditions for the purpose of determining not only the recovery of $P_2O_5$ values but also fluorine evolution versus reaction time. The reaction vessel was a preheated Dewar flask. Unheated sulfuric acid (95 percent) and pond water were poured simultaneously into a reaction vessel with vigorous agitation from an electric mixer. The maximum temperature reached was 248° F. The agitation was continued and samples withdrawn at time intervals for fluorine analysis, the results being shown by the following table:

TABLE I

| Samples | Percent $H_2SO_4$ | Percent F | Theoretical Percent F | Percent F Evolved |
|---|---|---|---|---|
| Sulfuric acid feed | 95.47 | | | |
| Pond water feed | | 0.52 | | |
| Dilute Acid after 1 minute | 61.50 | 0.09 | 0.184 | 51.1 |
| Dilute acid after 10 minutes | 61.97 | 0.05 | 0.184 | 72.8 |
| Dilute acid after 20 minutes | 62.35 | 0.04 | 0.184 | 78.3 |
| Dilute acid after 30 minutes | 62.91 | 0.03 | 0.184 | 83.7 |
| Dilute acid after 40 minutes | 62.51 | 0.03 | 0.184 | 83.7 |
| Dilute acid after 60 minutes | 62.91 | 0.02 | 0.184 | 89.1 |
| Dilute acid after 120 minutes | 63.02 | 0.01 | 0.184 | 94.6 |
| Dilute acid after 180 minutes | 63.43 | 0.01 | 0.184 | 94.6 |

All of the $P_2O_5$ content of the pond water (about 2 percent) was recovered in the sulfuric acid. From the foregoing test, it is noted that after a 30-minute reaction time, approximately 84 percent of the fluorine was removed.

Example IV

The reaction equipment consisted of a glass filter flask and a polyethylene condenser connected with tygon tubing to filter flask traps and to a source of vacuum. Sulfuric acid was placed in the filter flask and was stirred by a magnetic stirrer. For supplying heat, a hot plate was employed. Vacuum was applied to the system and the sulfuric acid heated to 200° F. Pond water was introduced through a separatory funnel. The rate of pond water addition caused temperature and vacuum fluctuations. The addition rate was adjusted so as to hold the temperature as near as possible to 230° F. The reaction was allowed to continue for 30 minutes.

Three tests were carried out under the conditions and with the results described as follows:

*Test 1.*—15 inches mercury vacuum. Maximum temperature reached—257° F.

440 grams 95.33% $H_2SO_4$ and 260 grams of 0.42% F pond water reacted.
Products:
    640 grams sulfuric acid—65.54% $H_2SO_4$, 0.04% F
    54 grams distillate—1.32% $H_2SiF_6$, 0.99% F
    1.6 grams silica—No analyses
    Theoretical F in diluted $H_2SO_4$ if no F volatilized—0.169%
    76.5% of fluorine was volatilized
    27.6% of fluorine is unaccounted for. It is probably present in the silica.

*Test 2.*—10 inches mercury vacuum. Maximum temperature reached—266° F.

440 grams of 95.33% $H_2SO_4$ and 260 grams of 0.42% F pond water reacted.
Products:
    665 grams sulfuric acid—63.37% $H_2SO_4$, 0.04% F
    30 grams distillate—2.15% $H_2SiF_6$, 1.76% F
    1.5 grams silica—No analyses
    Theoretical F in diluted $H_2SO_4$ if no F volatilized—0.164%
    75.6% of fluorine was volatilized
    27.3% of fluorine is unaccounted for.

*Test 3.*—6 inches mercury vacuum. Maximum temperature reached—273° F.

440 grams of 95.33% $H_2SO_4$ and 260 grams of 0.42% F pond water reacted.
Products:
    660 grams sulfuric acid—63.63% $H_2SO_4$, 0.03% F
    33 grams distillate—1.98% $H_2SiF_6$, 1.48% F
    1.8 grams silica—No analyses
    Theoretical fluorine in diluted $H_2SO_4$ if no fluorine volatilized—0.165%
    81.9% of fluorine was volatilized.
    37.2% of fluorine is unaccounted for.

In the three tests, the $P_2O_5$ values (1.5 percent) in the pond water were recovered in their entirety with the sulfuric acid.

While in the foregoing specification we have set out specific procedures in considerable detail for the purpose of illustrating embodiments of the invention, it will be understood that such details may be varied widely by those skilled in the art without departing from the spirit of our invention.

We claim:
1. In a process in which phosphate rock is digested with sulfuric acid and the recovered phosphoric acid is concentrated and gases and vapors from the acid containing $P_2O_5$, silica and fluorine scrubbed with water and the water containing said $P_2O_5$, silica and fluorine collected as pond water in a pond exposed to the sun and atmosphere to bring about concentration of the $P_2O_5$ values in said water, the steps of diluting concentrated sulfuric acid with said pond water with agitation whereby under the heat of dilution fluoride vapors are evolved, recovering the $P_2O_5$ values in said dilute sulfuric acid, and reusing the same in said digestion of phosphate rock.
2. The process of claim 1 in which said evolved fluoride vapors are contacted with water, the resulting stream filtered to remove silica, and the product recovered as fluosilicic acid.
3. The process of claim 1 wherein said concentrated sulfuric acid is diluted to about 50 to 80% $H_2SO_4$.
4. The process of claim 1 wherein substantially all of the fluoride vapors are evolved under the heat of dilution of said concentrated sulfuric acid.

References Cited

UNITED STATES PATENTS

| | | | |
|---|---|---|---|
| 1,938,533 | 12/1933 | Penfield | 23—153 |
| 2,636,806 | 4/1953 | Winter | 23—153 XR |
| 2,952,334 | 9/1960 | Provoost et al. | 23—153 XR |
| 2,962,357 | 11/1960 | Williams et al. | 23—165 |
| 3,091,513 | 5/1963 | Parish | 23—153 |
| 3,151,941 | 10/1964 | Hollingsworth et al. | 23—165 |
| 3,256,061 | 6/1966 | Tufts et al. | 23—153 |
| 3,273,713 | 9/1966 | Parish | 23—153 |

OTHER REFERENCES

Smith's College Chemistry, 7th edition, 1960, p. 505, Appleton-Century-Crofts, Inc., New York.

EDWARD STERN, Primary Examiner

U.S. Cl. X.R.
23—165, 182